United States Patent
Sinclair et al.

(10) Patent No.: US 9,417,335 B2
(45) Date of Patent: Aug. 16, 2016

(54) SHOCK MOUNTED SENSOR PACKAGE WITH THERMAL ISOLATION

(71) Applicant: CBG Corporation, Austin, TX (US)

(72) Inventors: Paul L. Sinclair, Austin, TX (US); Robert Scott Neves, Austin, TX (US)

(73) Assignee: CBG Corporation, Austin, TX (US)

( * ) Notice: Subject to any disclaimer, the term of this patent is extended or adjusted under 35 U.S.C. 154(b) by 0 days.

(21) Appl. No.: 14/510,677

(22) Filed: Oct. 9, 2014

(65) Prior Publication Data

US 2015/0097112 A1    Apr. 9, 2015

Related U.S. Application Data

(60) Provisional application No. 61/888,899, filed on Oct. 9, 2013.

(51) Int. Cl.
| | |
|---|---|
| *G01T 1/20* | (2006.01) |
| *E21B 36/00* | (2006.01) |
| *E21B 47/00* | (2012.01) |
| *G01V 5/04* | (2006.01) |
| *E21B 47/01* | (2012.01) |

(52) U.S. Cl.
CPC .............. *G01T 1/20* (2013.01); *E21B 36/003* (2013.01); *E21B 47/011* (2013.01); *G01V 5/04* (2013.01)

(58) Field of Classification Search
CPC ....... E21B 36/003; E21B 47/011; G01T 1/20; G01V 5/04
See application file for complete search history.

(56) References Cited

U.S. PATENT DOCUMENTS

| | | | |
|---|---|---|---|
| 4,400,858 A | 8/1983 | Goiffon et al. | 24/546 |
| 5,931,000 A | 8/1999 | Turner et al. | 62/3.2 |
| 6,064,210 A | 5/2000 | Sinclair | 324/369 |
| 6,134,892 A | 10/2000 | Turner et al. | 62/3.2 |

*Primary Examiner* — Mark R Gaworecki
(74) *Attorney, Agent, or Firm* — Campbell Stephenson LLP

(57) ABSTRACT

A logging while drilling (LWD) tool can include a shock mounted sensor package with thermal isolation. For example, a LWD tool can include a pressure housing surrounding a cavity. A sensor package that includes at least one end connection can be coupled within the cavity. The LWD tool can also include a support structure coupled to the pressure housing and supporting the end connection of the sensor package. The support structure is configured to provide damping along at least one of the axial, radial, and azimuthal axes. The end connection is configured to inhibit thermal conductivity between the support structure and the sensor package.

17 Claims, 4 Drawing Sheets

SHOCK MOUNTED SENSOR PACKAGE WITH THERMAL ISOLATION

FIELD OF THE INVENTION

This invention relates to the field of logging while drilling, particularly during oil and gas development and exploration.

BACKGROUND

A variety of sensors are used in modern drilling operations, particularly in the search for oil and natural gas. Such sensors can include accelerometers and magnetometers (for directional or orientation sensing, such as to identify magnetic North and/or a gravity vector) and radiation sensors (to determine rock properties). These sensors are combined with electronic circuits that can amplify and process the electrical signals and together form a sensor package. The processed data generated by a sensor package are transmitted in real-time to the surface (e.g., using a mud-pulse telemetry system). The process of drilling while using such a sensor package is called logging while drilling (LWD) and can be used to determine the direction in which the drill-bit is headed and the type of rock encountered. The data from the tool can be analyzed by geologists while drilling and employed to make informed decisions about how deep to drill a vertical well or for steering the drill-bit in directional-drilling operations. This process is known as geosteering.

Radiation sensors are generally of two types: scintillation and proportional. Scintillation crystals are used to detect gamma radiation by converting incident gamma photons into a brief flash of light. The light pulse may be detected by a photomultiplier that is optically coupled to the crystal, and whose output is an electrical pulse. A typical example of scintillator material is a single crystal of Sodium Iodide doped with Thallium. An alternative radiation sensor is the proportional (gas-filled tube) type that directly outputs an electrical pulse. Yet another possible alternative is a bulk semiconductor type such as a Lithium-drifted Germanium sensor. A particular application of such a radiation sensor is in logging tools to determine the natural radioactive properties of rock formations encountered by a borehole.

Sensor instruments like those used to detect orientation and/or radiation are subjected to extreme mechanical shock and vibration during the drilling process. However, typical accelerometers, magnetometers, scintillator crystals, photo-multipliers, and the like are inherently rather fragile. The result is that these expensive components can fail during drilling operations, resulting in very expensive down-time of the drilling rig to retrieve the logging tool from the well. Furthermore, drilling technology advances, such as fast drilling and under-balanced drilling, have increased the shock levels imposed on the sensors.

BRIEF DESCRIPTION OF THE DRAWINGS

A more complete understanding of the present invention may be acquired by referring to the following description and the accompanying drawings, in which like reference numbers indicate like features.

Figure 1:
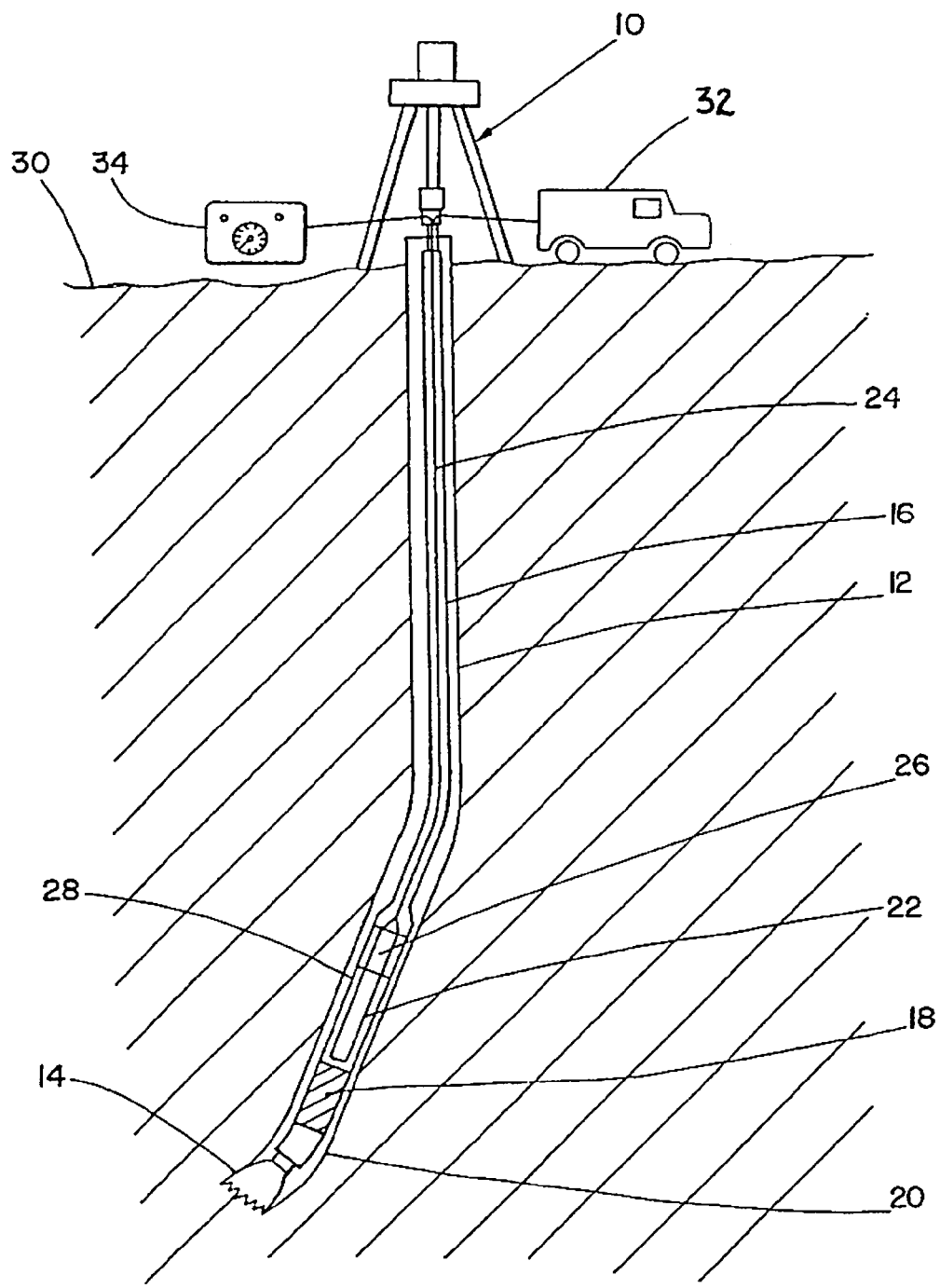
FIG. 1 illustrates a system used to drill a borehole, which includes a LWD tool that includes a shock-mounted sensor package with thermal isolation, according to one embodiment of the invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 illustrates how a drilling operation employs drilling rig 10 to cut a borehole 12 into the earth, penetrating the subsurface geological formation. Drillstring 16 passes through borehole 12 and is coupled between drilling rig 10 and a drill bit 14. Drillstring 16 includes drill bit 14, drill collars 28, and drill pipe.

The lowest part of drillstring 16 is made up of drill collars 28. Drill collars 28 are heavy walled pipe that provide weight on drill bit 14 and strength to resist buckling under their own weight. The drill pipe is thinner walled. The drill pipe is kept in tension (which may be effected by collars 28 placing weight on drill bit 14) to prevent buckling. Drill collars 28 may have radial projections (not shown) called stabilizers. Short drill collars, which may be adapted for specialized functions, are called "subs," and references herein to drill collars are intended to include subs.

Drilling rig 10 turns drill bit 14, which cuts through the rock at the bottom of borehole 12. In some situations, drilling rig 10 turns drill bit 14 by attaching drill bit 14 to the lower end of drillstring 16 and turning drillstring 16 with powered equipment at the surface. Alternatively, as shown in FIG. 1, drill bit 14 may be driven by a motor 18, which is adjacent to drill bit 14 in borehole 12, through bent sub 20. The illustrated arrangement is known as a "steering tool" system, in which drillstring 16 does not need to rotate to turn the drill bit. However, drillstring 16 can be turned to steer drill bit 14, so as to control the direction of advance of borehole 12, thus permitting the route of borehole 12 to be precisely steered as desired through the subsurface geologic formation.

A logging-while-drilling (LWD) tool 22 is placed in drillstring 16, near drill bit 14 (if LWD tool 22 is used for geosteering, it may be desirable to locate LWD tool 22 as close as possible to drill bit 14). In a steered system, the LWD tool may be placed above mud motor 18, such that LWD tool 22 receives power and returns data to the surface through a wire line cable 24 that is passed down the center of a non-rotating (or slowly rotating) drillstring 16. In a system that uses a rotating drillstring 16 to turn drill bit 14, LWD tool 22 may be placed just above drill bit 14, and a mud pulse data telemetry system (or any other appropriate telemetry method) can be used to return information to the surface. Thus, LWD tool 22 is operatively positioned in borehole 12, typically with an annular space (e.g., filled with drilling mud) between tool 22 and the borehole wall.

LWD tool 22 can incorporate or be associated with directional sensors 26 that provide directional information to the driller to assist in controlling the steering of the drill bit. For example, such directional sensors can be calibrated to indicate the position of the LWD tool 22 relative to an absolute direction, such as the gravity vector or magnetic north.

LWD tool 22 also includes several receiving sensors that are each configured to measure a property of the geologic formation surrounding the borehole. These sensors can detect currents, magnetic fields, radiation, or some other characteristic that can be measured and used to determine information useful to the drilling process. LWD tool 22 can also include or be coupled to telemetry or other communication equipment to transmit this information to the earth's surface.

Any of the various sensors within LWD tool 22 can be included, along with relevant electronic circuitry and other components, in a shock-mounted sensor package as described below. Such a shock-mounted sensor package can also be configured to thermally isolate the sensors within the sensor package from potentially adverse temperatures and/or temperature changes.

Above the earth's surface 30, telemetry receivers and/or other appropriate communication equipment can be located in a logging truck 32 located near drilling rig 10. Thus, communication equipment is positioned to receive and interpret the information generated by LWD tool 22 and directional sensors 26, so that the information can be collected for later analysis and/or used to steer wellbore 12 into the desired position (e.g., to maximize recovery of hydrocarbons from a selected reservoir).

A data display panel 34 can be provided on or near drilling rig 10 and/or logging truck to give an operator (e.g., a driller, engineer, geologist, or the like) real-time information about the directional progress of wellbore 12 as well as the formation properties of the geologic formation currently near LWD tool 22. In one embodiment, data display panel 34 can be part of a computing device (e.g., data display panel 34 can be rendered on the screen of a laptop computer used by an operator of drilling rig 10).

Figure 2:
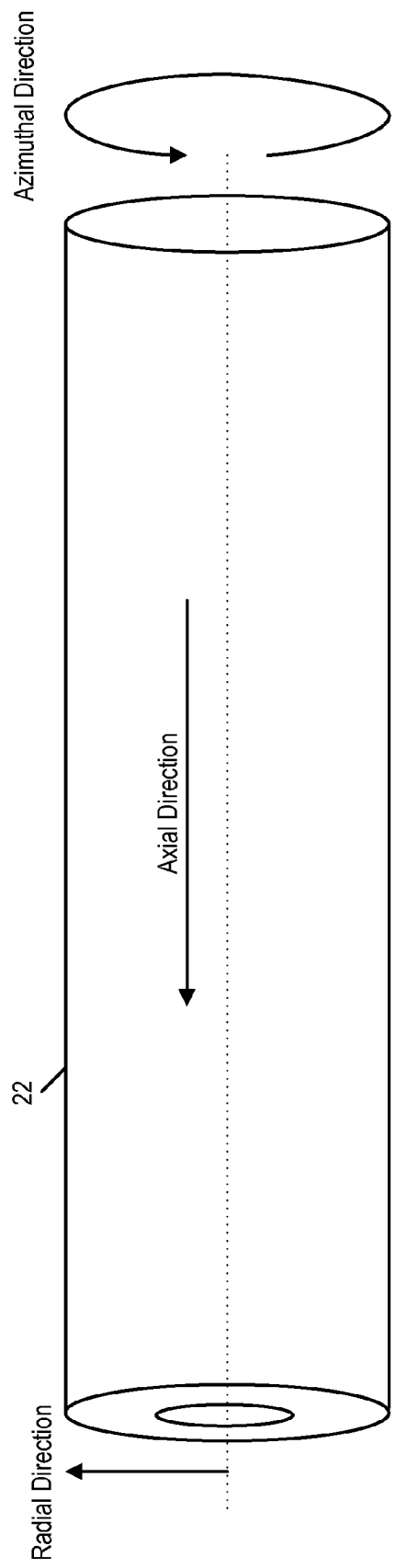
FIG. 2 illustrates a LWD tool in order to show the three basic directional components of mechanical stresses that can be encountered during a drilling operation.

FIG. 2 illustrates a block diagram of a LWD tool, such as LWD tool 22 of FIG. 1, and shows how the terms of reference to drilling tools are usually given in cylindrical coordinates. These terms of reference are used throughout this disclosure to describe various mechanical stresses and shocks that a drilling tool can experience. As shown there are three orthogonal directions that can be used to describe shocks: axial, radial, and azimuthal. In FIG. 2, these directions are illustrated. The axial direction runs along the length of the cylinder. The radial direction extends though the center of the cylinder, perpendicular to the axial direction. Finally, the azimuthal direction is a direction in which the cylinder can rotate around its axial axis.

These directions allow the different shocks that a cylindrical LWD tool may experience to be described. While the following examples talk about shocks that are primarily defined in one direction only, it is noted that many shocks can include components in multiple directions at once.

Axial shocks originate due to the phenomenon of bit-bounce, which is the tendency of the drill bit to rebound from the rock face during its cutting action. Other sources of axial shocks are mechanisms known as "agitators," which are often used to accelerate drilling by imposing large axial oscillations on the drill bit.

Radial shocks can be caused by the drill collar coming into contact with the borehole wall. Mechanisms known as "exciters" are sometimes used to introduce radial oscillations of the drill collar to encourage the flushing of drill-cuttings.

Finally, high rotational accelerations in the azimuthal direction can be caused by the "stick-slip" motion of modern polycrystalline diamond cutter (PDC) drill bits as they dig into the rock and release when the rock breaks in shear mode.

All of these different types of shocks can lead to malfunction or even failure of the components within a LWD tool. Such components can include accelerometers and magnetometers (for sensing direction or orientation, such as to identify magnetic North and/or a gravity vector) as well as current, magnetic field, and/or radiation sensors (to determine rock properties). As noted above, these sensors are combined with electronic circuits (which are also examples of components that can, in some embodiments, be susceptible to malfunction) that can amplify and process the electrical signals to form a sensor package that is then protected within a LWD tool. The processed data generated by a sensor package can be transmitted in real-time to the surface (e.g., using a mud-pulse data telemetry system), as well as stored locally within the LWD tool. The processed data can be used to determine the direction in which the drill-bit is headed and the type of rock encountered. The data from the tool can be analyzed by geologists and employed to make informed decisions about how deep to drill a vertical well or for steering the drill-bit in directional-drilling operations.

Radiation sensors are often designed to sense gamma photons emitted by a radioactive source. This is very useful in drilling because it allows the identification of rock types by detecting known naturally-occurring isotopes that emit gamma photons, such as uranium, potassium, and thorium. Detecting particular rock types (based upon the detected isotopes) in turn allows an operator to determine where the drill bit currently is (e.g., by comparing the type of rock the drill bit is currently encountering to geologic survey data) and to adjust the course of drilling if needed.

One type of radiation sensor uses scintillation crystals, which detect gamma radiation by converting incident gamma photons into a brief flash of light. This light pulse may then be detected by a photomultiplier that is optically coupled to the crystal, and whose output is an electrical pulse. A typical example of scintillator material is a single crystal of sodium iodide doped with thallium. An alternative radiation sensor is the proportional (gas-filled tube) type that directly outputs an electrical pulse. Yet another possible alternative is a bulk semiconductor radiation sensor such as a lithium-drifted germanium sensor.

As briefly noted above, sensor instruments like those used to detect orientation and/or radiation are subjected to extreme mechanical shock and vibration during the drilling process. However, typical accelerometers, magnetometers, scintillator crystals, photomultipliers, and the like are inherently rather fragile. Furthermore, drilling technology advances, such as fast drilling and under-balanced drilling, have increased the shock levels imposed on the sensors. Additionally, In the worst-case example, sensor components may fail due to conditions experienced while drilling. For example, a scintillator crystal can fracture, or a photomultiplier can suffer broken internal wires. To replace failed components, drilling may need to be stopped while the LWD tool is retrieved from the well, resulting in very expensive down-time of the drilling rig.

As briefly noted above, in order to potentially improve the ruggedness and reliability of sensor packages in drilling operations, the sensor package can be combined with a shock absorption system, as described below, along with thermal isolation and/or means to remove heat generated by the relative motion of the sensor package.

Figure 3:
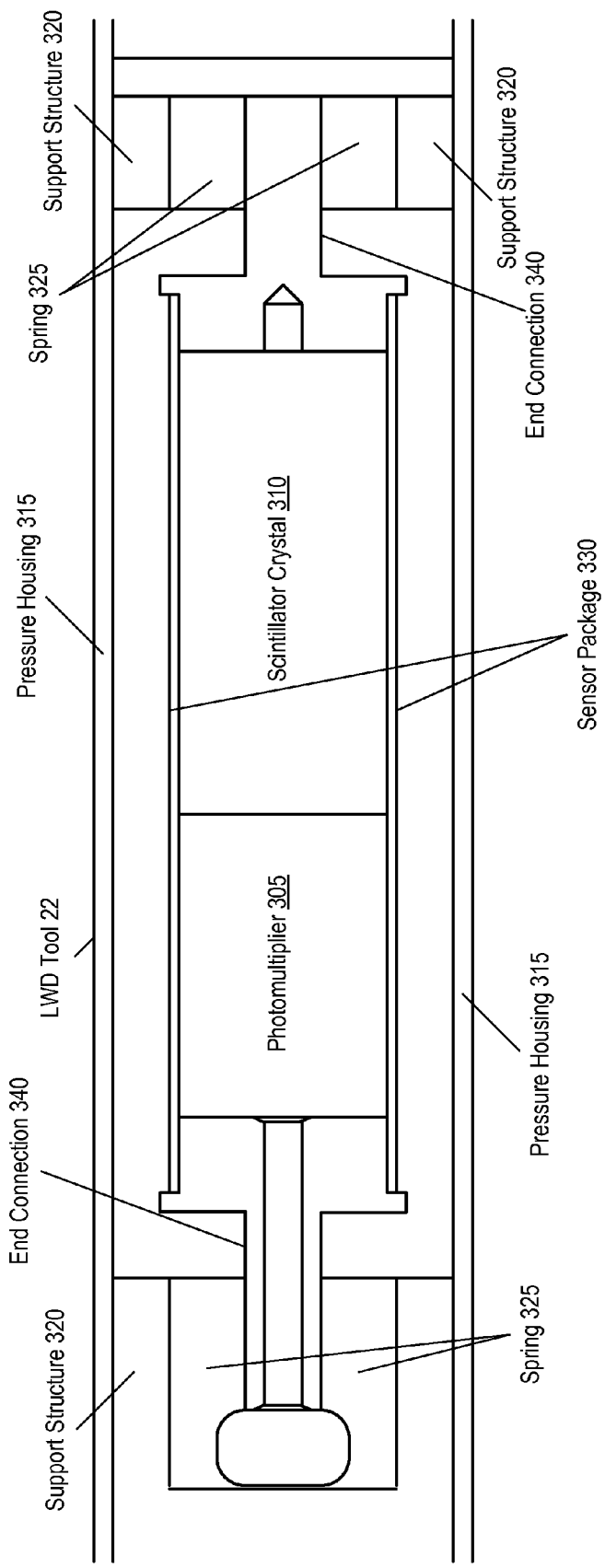
FIG. 3 shows a block diagram of LWD tool that includes a shock-mounted sensor package with thermal isolation, according to one embodiment of the invention.

FIG. 3 illustrates a sectional block diagram of a LWD tool 22 that includes a sensor package 330, which in this example is a radiation detector subassembly that includes a scintillator crystal 310 used to detect gamma rays and a photomultiplier 305 to detect the output from the scintillator crystal 310. The sensor package 330 can, in one example, be similar to that disclosed in U.S. patent application Ser. No. 13/840,310, titled "Rugged Scintillation Crystal Assembly", filed Mar. 15, 2013, and naming Paul L. Sinclair as an inventor, which is hereby incorporated by reference for all purposes as if completely and fully set forth herein. In other embodiments, other types of sensor packages may be used (e.g., including those that do not include photomultipliers and/or scintillator crystals.

The drilling tool includes a support structure 320 for the sensor package 330, which fits inside a pressure-housing 315 that can withstand the hydrostatic pressure of downhole drilling fluids. Rubber materials have physical properties that include both spring and damping components; accordingly, in many embodiments, support structure 320 may be formed from rubber. However, other materials may also be used instead of and/or in addition to rubber or rubber-like materials. By choosing a particular shape for a rubber or rubber-like support structure 320, the support structure 320 can provide a non-linear spring rate with sufficient natural damping to inhibit the ability of destructive mechanical resonances to adversely affect the sensor package 330. In FIG. 3, the support structure 320 is of a generally thick-wall annular shape that provides compliant support in all three axes (radial, axial, and azimuthal) while also damping relative motions.

Damping involves energy absorption, which converts mechanical energy into heat. In extended drilling operations with high vibration and shock levels, considerable heat can be generated. This heat can adversely affect the sensitive sensor package 330. Scintillator crystals in particular exhibit significant reduction in light output with increases in temperature, on the order of −50% for a change of +150 degrees Celsius. Temperature compensation schemes are generally provided in the associated electronic circuits, but these methods are limited in accuracy, so temperature excursions beyond the ambient levels in a borehole are to be avoided as far as possible. Furthermore, the life of sensor components is seriously degraded by high temperatures, so limiting excess heating is desirable.

To reduce the ability of the heat generated by the damping process to enter the sensor package 330 (and thus damage the crystal and photomultiplier components within the sensor package), the heat can be dissipated by the configuration shown in FIG. 3.

In FIG. 3, the sensor package 330 is supported by two annular rubber springs 325 at each end. The springs can be preferably formed of a high-temperature material such as Viton™ (a fluoroelastomer) that is molded into, and bonded to, a metallic support structure. The support structure can be formed from relatively thermally conductive material, such as aluminum and/or copper.

Sensor package 330 is attached to both springs through end connections 340 that may be of metal, such as stainless steel, or high-strength plastic, such as Torlon™ or PEEK™. The end connections 340 can be selected from materials that have a relatively low thermal conductivity, especially relative to the materials used in the remainder of the support structure, so as to reduce the thermal coupling between the springs 325 and sensor package 330.

It is noted that, as shown in FIG. 3, sensor package 330 effectively floats within the cavity formed within the annular walls of the pressure housing 315, except for where the springs 325 and support structure 320 contact the end connections 340. The space between sensor package 330 and the inside of pressure housing 315 can be filled with air or any other appropriate substance.

The annular shape of the rubber springs 325 is designed to be compliant in all three axes of relative motion: axial, radial, and azimuthal. The specific dimensions of the rubber springs are chosen to provide an appropriate spring-rate in each axis, given the particular dimensions of the LWD tool 22 and sensor package 330 being used. Consideration is also given to the need to limit the maximum deflection of the sprung mass to reduce the likelihood of the sensor package 330 colliding with the support structure 320 or pressure housing 315. Here, the non-linear characteristics of the rubber can be employed to advantage along with the shape of the spring to make a spring 325 whose spring-rate increases significantly near the end of the range of travel, thus increasing the likelihood that collisions will be prevented.

The majority of the heat generated in the springs 325 will tend to flow to the outside diameter of the annulus (having the largest surface-area, especially relative to that of the end-connections), where it will be readily dissipated into the outer wall of the pressure housing 315 and the surrounding drilling mud, which acts as a heat-sink.

The amount of sprung mass determines the total heat flux that must be dissipated for any given amplitude of mechanical vibration or shock. The amount of sprung mass can be reduced by keeping the size of the sensor package 330 relatively small (in other words, less-fragile components of the LWD tool 22 can be located in areas that are not protected by the springs 325). In this example, the scintillator crystal 310 and associated photomultiplier 305 need to be included in the sensor package 330 because both components are relatively fragile and because the two components must be optically coupled to each other. In contrast, electrical wires (not shown) can couple the photomultiplier 305 to associated electronic circuits (not shown) that are less fragile and thus do not need to be shock-isolated within sensor package 330. As such, these electronic circuits can be located elsewhere within the LWD tool 22.

The spring components 325 are preferably made of molded-rubber or rubber-like materials as described, but could be alternatively constructed using more conventional metallic coil-springs combined with fluid-filled mechanical dampers, or any other appropriate spring and dampener elements.

Thus, FIG. 3 illustrates a shock-mounted sensor package that also provides thermal isolation to the sensor package. The sensor package is coupled to at least one shock-isolating spring element, and that spring element is thermally coupled to heat-dissipating means (e.g., such as the support structure 320 and/or pressure housing 315 shown in FIG. 3). A thermally-isolating mechanical coupling (such as the end connections 340 in FIG. 3) can be placed between the sensor package 330 and the spring element 325.

While FIG. 3 has been described with reference to sensor package that includes a scintillator crystal and a photomultiplier, other sensor packages can also be used in this configuration. For example, the sensor package could alternatively (or additionally) include a radiation detector that includes a proportional gas-filled tube or a semiconductor sensor, an orientation detector that includes one or more accelerometers and/or magnetometers, and the like.

The spring element 325 can include an annular- or cylindrical-shaped elastomeric material. The elastomeric material can have significant mechanical damping properties. Alternatively (or additionally), the spring element can include a metallic spring component and a mechanical damper component.

The spring element 325 can be configured to act in at least one physical axis of the drilling tool. In many embodiments, a single spring element 325 can act in all three axes (radial, axial, and azimuthal), thus providing six degrees of freedom and providing shock absorption and damping in two directions along all three axes.

Figure 4:
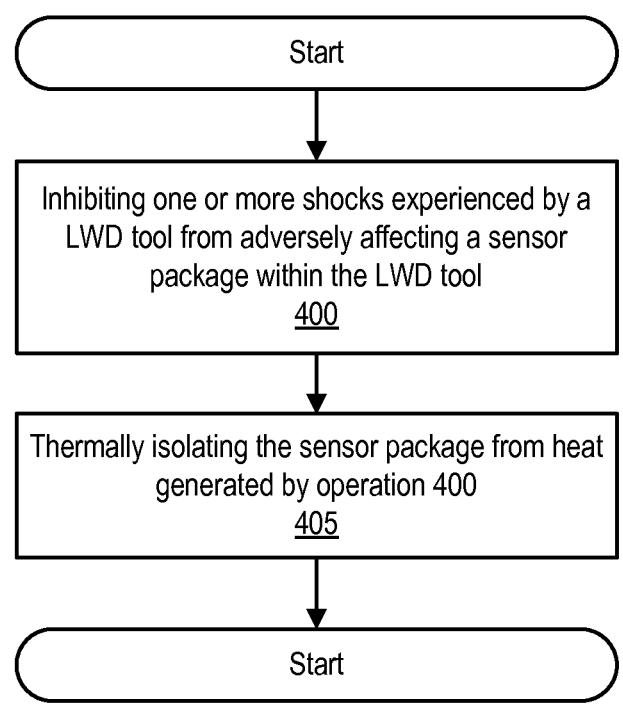
FIG. 4 is a method of using a shock-mounted sensor package with thermal isolation, according to one embodiment.

FIG. 4 is a simplified flowchart of a method of using a LWD tool that includes a shock-mounted sensor package with thermal isolation as described above. Here, at 400, shocks experienced by the LWD tool are inhibited from adversely affecting the sensor package. As described above, this act can be performed by a support structure that is designed to dampen forces in at least one direction along at least one of the axes shown in FIG. 2. In some embodiments, the support structure can provide damping in both directions along multiple axes.

At 405, the sensor package is, at least partially, thermally isolated from any heat generated at 400. As described above, this can be done by using materials that have relatively low thermal conductivity to form end connections for a sensor package. These end connections can effectively reduce the thermal transfer between the sensor package and any other components, such as the support structure and springs discussed with respect to FIG. 3.

Although the present invention has been described in connection with several embodiments, the invention is not intended to be limited to the specific forms set forth herein. On the contrary, the present invention is intended to cover such alternatives, modifications, and equivalents as can be reasonably included within the scope of the invention as defined by the appended claims.

What is claimed is:

1. A system, comprising:
   a logging while drilling (LWD) tool comprising a cylindrically shaped pressure housing surrounding a cavity;
   a cylindrically shaped sensor package coupled within the cavity, wherein the sensor package comprises at least one end connection; and
   a support structure coupled to the pressure housing and supporting the at least one end connection of the sensor package, wherein the support structure is configured to provide damping along at least one of the axial, radial, and azimuthal axes, and wherein the at least one end connection is configured to inhibit thermal conductivity between the support structure and the sensor package.

2. The system of claim 1, wherein the sensor package comprises a photomultiplier and a scintillator crystal.

3. The system of claim 1, wherein the support structure is configured to provide damping along all three of the axial, radial, and azimuthal axes.

4. The system of claim 1, wherein the support structure is an annular formed-rubber structure.

5. The system of claim 1, wherein the support structure is coupled to the at least one end connection by at least one spring.

6. The system of claim 5, wherein the spring and the support structure are formed from materials that have higher thermal conductivity than the at least one end connection.

7. The system of claim 5, wherein the spring-rate of the spring increases as the sensor package moves closer to the support structure.

8. The system of claim 1, further comprising one or more electronic components configured to receive an output from the sensor package, wherein the one or more electronic components are located within the LWD tool but are not located within the sensor package.

9. A method, comprising:
   inhibiting a force experienced by a LWD tool from affecting a cylindrically shaped sensor package, wherein the LWD tool comprising a cylindrically shaped pressure housing surrounding a cavity, wherein the sensor package is located within the cavity of the LWD tool, and wherein the pressure housing and sensor define a common cylindrical axis; and
   inhibiting heat generating by the inhibiting the force from being transferred to the sensor package.

10. The method of claim 9, wherein the sensor package comprises a photomultiplier and a scintillator crystal.

11. The method of claim 9, wherein the inhibiting the force is performed, at least in part, by a support structure.

12. The method of claim 11, wherein the support structure is configured to provide damping along all three of the axial, radial, and azimuthal axes.

13. The method of claim 11, wherein the support structure is an annular formed-rubber structure.

14. The method of claim 11, wherein the inhibiting the heat from being transferred is performed, at least in part, by an end connection of the sensor package, wherein the end connection is formed from a material having a lower thermal conductivity than the support structure, and wherein the support structure is coupled to the at least one end connection by at least one spring.

15. The method of claim 14, wherein both the spring and the support structure are formed from materials that have higher thermal conductivity than the end connection.

16. The method of claim 14, wherein the spring-rate of the spring increases as the sensor package moves closer to the support structure.

17. The method of claim 9, wherein the LWD tool comprises one or more electronic components configured to receive an output from the sensor package, wherein the one or more electronic components are located within the LWD tool but are not located within the sensor package.

* * * * *